(12) United States Patent
Lin et al.

(10) Patent No.: US 9,324,294 B2
(45) Date of Patent: Apr. 26, 2016

(54) GRAPHICS SYSTEM FOR SUPPORTING MULTIPLE DIGITAL DISPLAY INTERFACE STANDARDS

(75) Inventors: Yao-Nan Lin, Taipei (TW); Hsin-Yu Cheng, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 2150 days.

(21) Appl. No.: 12/419,761

(22) Filed: Apr. 7, 2009

(65) Prior Publication Data
US 2010/0253691 A1 Oct. 7, 2010

(51) Int. Cl.
*G06F 13/14* (2006.01)
*G09G 5/00* (2006.01)
*G06F 3/14* (2006.01)
*G09G 5/36* (2006.01)

(52) U.S. Cl.
CPC .............. *G09G 5/006* (2013.01); *G06F 3/1431* (2013.01); *G09G 5/36* (2013.01); *G09G 2360/02* (2013.01); *G09G 2370/047* (2013.01); *G09G 2370/10* (2013.01); *G09G 2370/12* (2013.01)

(58) Field of Classification Search
USPC ........................................................ 345/520
See application file for complete search history.

(56) References Cited

U.S. PATENT DOCUMENTS

2006/0267987 A1* 11/2006 Litchmanov ................... 345/502
2009/0201312 A1* 8/2009 Wu et al. ........................ 345/619

* cited by examiner

*Primary Examiner* — Edward Martello
(74) *Attorney, Agent, or Firm* — Artegis Law Group, LLP

(57) ABSTRACT

The present invention sets forth an apparatus for supporting multiple digital display interface standards. In one embodiment, the apparatus includes a graphics processing unit (GPU) configured to determine a display device type of a display device that is in connection with a digital display interconnect, receive a display device information associated with the display device, and output a first data signal to the display device. The display device is of display port (DP) digital display interface standard and the digital display interconnect is of digital visual interface (DVI) digital display interface standard. The apparatus further includes a removable adaptor circuitry between the display device and the digital display interconnect.

20 Claims, 4 Drawing Sheets

GRAPHICS SYSTEM FOR SUPPORTING MULTIPLE DIGITAL DISPLAY INTERFACE STANDARDS

BACKGROUND OF THE INVENTION

1. Field of the Invention

The present invention generally relates to a graphics system, and more particularly, to a graphics system that is capable of supporting multiple digital display interface standards.

2. Description of the Related Art

Unless otherwise indicated herein, the approaches described in this section are not prior art to the claims in this application and are not admitted to be prior art by inclusion in this section.

As display devices complying with the latest digital display interface standards become more prevalent, accommodating connections among them becomes more and more important from the perspective of graphics system providers. To support this requirement, many solutions have been introduced. For example, graphics cards equipped solely with digital display interconnects meeting the display port (DP) digital display interface standard are offered. However, since display devices of non-DP digital display interface standards (e.g., digital visual interface (DVI) digital display interface standard) are still the mainstream in the current market such arrangement renders the backward compatibility more expensive because additional adaptors, such as DP-to-DVI adaptors, are necessary for facilitating the connection with the DVI-based display devices.

Moreover, due to physical space limitation associated with the graphics cards any attempt of placing a sufficient number of both DP- and DVI-based digital display interconnects on the same graphics card has been proved impractical.

What is needed in the art is thus a graphics system that is capable of supporting multiple digital display interface standards that can address the foregoing limitations.

SUMMARY OF THE INVENTION

An apparatus configured to interface a display device supporting a first digital display interface standard is provided. In one embodiment, the apparatus includes a removable adaptor circuitry coupled to the display device, and a graphics processing unit (GPU) coupled to the removable adaptor circuitry via a digital display interconnect supporting a second digital display interface standard. The GPU is configured to determine a display device type of the display device that is in connection with the digital display interconnect, receive a display device information associated with the display device, and output a first data signal to the display device. The first digital display interface standard may refer to the display port (DP) digital display interface standard, and the second digital display interface standard may refer to the digital visual interface (DVI) digital display interface standard.

A computer readable medium containing a sequence of instructions for supporting multiple digital display interface standards is provided. In one embodiment, when a GPU executes the sequence of instructions, the execution causes the GPU to determine a display device type of the display device that is in connection with the digital display interconnect, receive a display device information associated with the display device, and output a first data signal to the display device.

A computing device capable of supporting multiple digital display interface standards is provided. In one embodiment, the computing device includes a display device supporting a first digital display interface standard, a graphics system having a digital display interconnect supporting a second digital display interface standard, and a GPU. The GPU is configured to determine a display device type of the display device that is in connection with the digital display interconnect, receive a display device information associated with the display device, and output a first data signal to the display device. The computing device further includes a removable adaptor circuitry coupled to the display device and the digital display interconnect, wherein the first digital display interface standard may correspond to the DP digital display interface standard, and the second digital display interface standard may correspond to the DVI digital display interface standard.

At least one advantage of the present invention is the DVI-based digital display interconnects on a single graphics card could be fully utilized to connect both DVI- and DP-based display devices, without incurring too much additional expenses.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
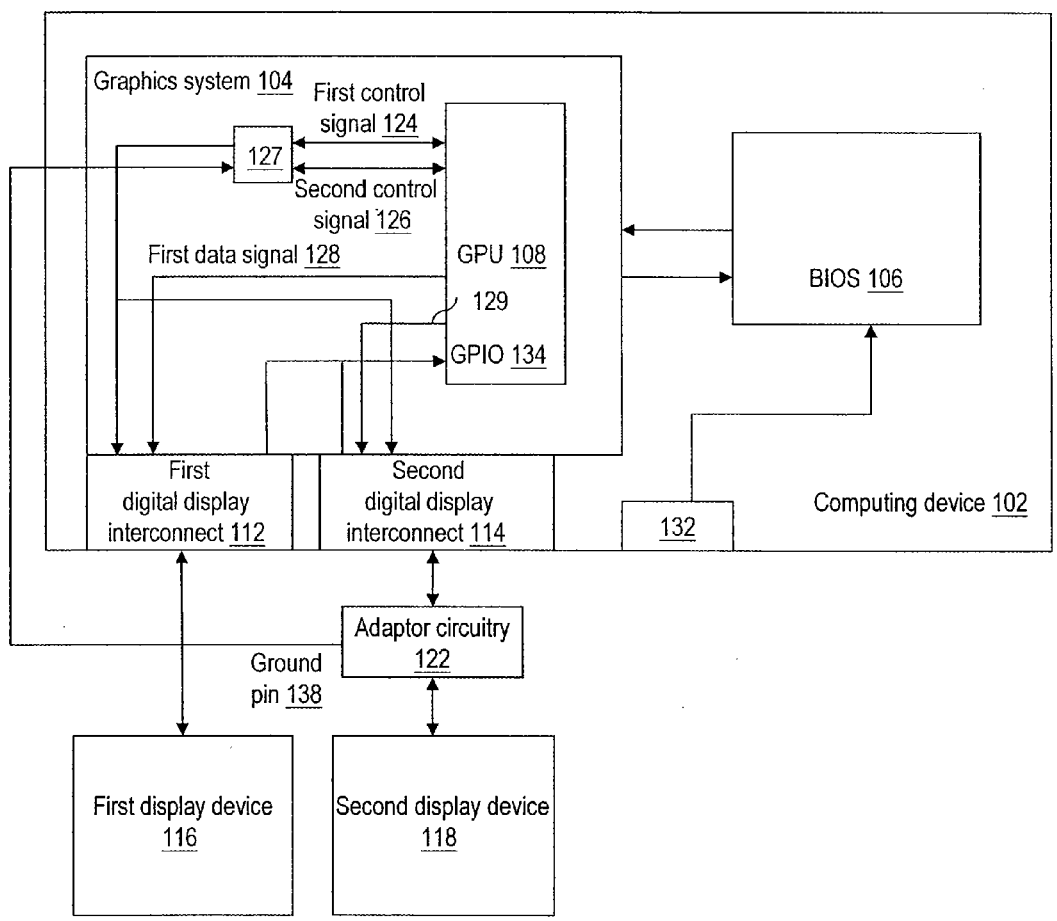
FIG. 1 is a simplified block diagram illustrating a computing device configured to implement one or more aspects of the present invention.

FIG. 1 is a simplified block diagram illustrating a computing device 102 configured to implement one or more aspects of the present invention. The computing device 102 includes a graphics system 104 and a basic input output system (BIOS) 106. The graphics system 104 further includes a graphics processing unit (GPU) 108, a first digital display interconnect 112, and a second digital display interconnect 114. The first digital display interconnect 112 and the second digital display interconnect 114 are for connection with first and second display devices 116 and 118, respectively. It is worth noting that the first digital display interconnect 112 and the second digital display interconnect 114 are of the same digital display interface standard. In one implementation, that digital display interface standard is DVI digital display interface standard. Accordingly, the connection between the first display device 116 and the first digital display interconnect 112 could be established successfully if the first display device 116 is of DVI standard. When the second display device 118 is of DP digital display interface standard, a removable adaptor circuitry 122, which is between the DP-based second display device 118 and the second digital display interconnect 114, is required. Consequently, the DP-based second display device 118 could be in connection with the second digital display interconnect 114.

In response to the connection of the display device, the GPU 108 may output first control signal 124 to the first digital display interconnect 112 or the second control signal 126 to the second digital display interconnect 114. As such, the first display device 116 could receive the first control signal 124 from the first digital display interconnect 112, and the second display device 118 could receive the second control signal 126 from the second digital display interconnect 114 through the adaptor circuitry 122. It is worth noting that the first control signal 124 and the second control signal 126 are from distinct signal pins of the GPU 108 and outputted to the first digital display interconnect 112 and the second digital display interconnect 114 after the selection of a first switch 127. The selection of the first switch 127 depends on which display device 116 or 118 has been in connection with the graphics system 104. When a DVI-based display device is connected, the first control signal 124 is outputted. When a DP-based display device is connected, the second control signal 126 is transferred. In one implementation, the signal pin that outputs the first control signal 124 is the I square C ($I^2C$) signal pin, while the second control signal 126 is from the auxiliary (AUX) signal pin of the GPU 108. The first control signal 124 and the second control signal 126 are of different formats (e.g., signal level) that are corresponding to the connected display devices 116 and 118. The first control signal 124 and the second control signal 126 are for asking for display device information of the display devices 116 and 118. Upon the receipt of the first control signal 124 and the second control signal 126, the first display device 116 and the second display device 118 respond with their corresponding information in forms of the first control signal 124 and the second control signal 126, back to the same signal pins of the GPU 108 from which the control signals 124 and 126 are outputted. In one implementation, the display device information is extended display identification data (EDID) information. The EDID information comprises size of display device, refreshing rate, and resolution rate.

Thereafter, the GPU 108 outputs a first data signal 128 to the first digital display interconnect 112 or a second data signal 129 to the second digital display interconnect 114 so that the first display device 116 or the second display device 118 could receive the first data signal 128 or the second data signal 129 for display. It is worth noting that the first data signal 128 and the second data signal 129 are from the different signal pins (digital link pins) of the GPU 108. In one implementation, the first data signal 128 in the form of a minimized differential signaling (TMDS) is outputted from a signal pin of "Link A.". On the other hand, the second data signal 129 from another signal pin (such as "Link B") could be for the DVI- or DP-based display device.

The GPU 108 could recognize the connection of the first display device 116 or the second display device 118 in multiple ways. In one implementation, the computing device 102 further includes a second switch 132 indicative of which display device has been in connection with the graphics system 104. The BIOS 106 is configured to receive that connection information from the second switch 132, and notify the GPU 108 of the same. The BIOS 106 may be including distinct BIOS chips (not shown), each of which is for receiving the information of the connection of the distinct display device 116 or 118. In another implementation, a general purpose input output (GPIO) pin of the GPU 108 is utilized by being electrically connected with the first digital display interconnect 112 and the second digital display interconnect 114. Whenever the first digital display interconnect 112 or the second digital display interconnect 114 is in connection with the first display device 116 or the second display device 118, the voltage level of the GPIO pin could vary accordingly so as to reflect the connection. In yet another implementation, a ground pin 138 of the adaptor circuitry 122, which is connected to the first switch 127, could be set to indicate the connection of the second display device 118 with the second digital display interconnect 114.

Figure 2A:
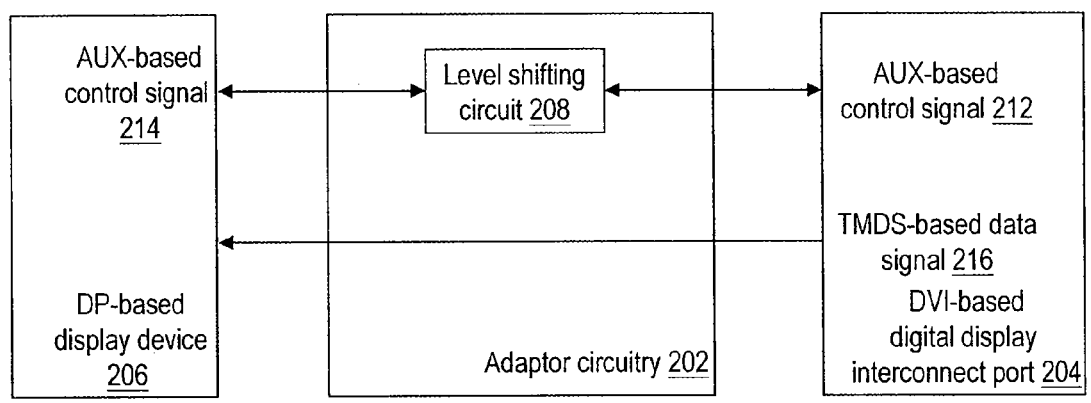
FIG. 2A is a simplified block diagram illustrating a removable adaptor circuitry according to one embodiment of the present invention.

In conjunction with FIG. 1, FIG. 2A is a simplified block diagram showing a removable adaptor circuitry 202 according to one embodiment of the present invention. The adaptor circuitry 202 is disposed between a DVI-based digital display interconnect 204 and a DP-based display device 206. The adaptor circuitry 202 further comprises a level shifting circuit 208. When the GPU 108 recognizes the connection between the second digital display interconnect 114 and the second display device 118, the GPU outputs the second control signal 126 and second data signal 129 to the second display device 118 through the adaptor circuitry 122. The adaptor circuitry 202 serves the same function as the adaptor circuitry 122 does in FIG. 1. In FIG. 2A, when the DVI-based digital display interconnect 204 (the second digital display interconnect 114 in FIG. 1) is in connection with of the DP-based display device 206 (the second display device 118 in FIG. 1), an AUX-based control signal 212 (the second control signal 126 in FIG. 1) from its AUX signal pin (not shown) to the DVI-based digital display interconnect 204. The AUX-based control signal 212 is to be received by the level shifting circuit 208. The display device information responded by the DP-based display device 206 is in the form of another AUX-based control signal 214 (the second control signal 126 in FIG. 1). The AUX-based control signal 214 will be transmitted back to the GPU 108 through the level shifting circuit 208 as well. The level shifting circuit 208 could be configured to raise the signal level of either or both of the AUX-based control signals 212 and 214. After getting the display device information, the GPU 108 could send a TMDS-based data signal 216 according to the display device information, to the DP-based display device 206 (the data signal 128) through the adaptor circuitry 202 for display.

Figure 2B:
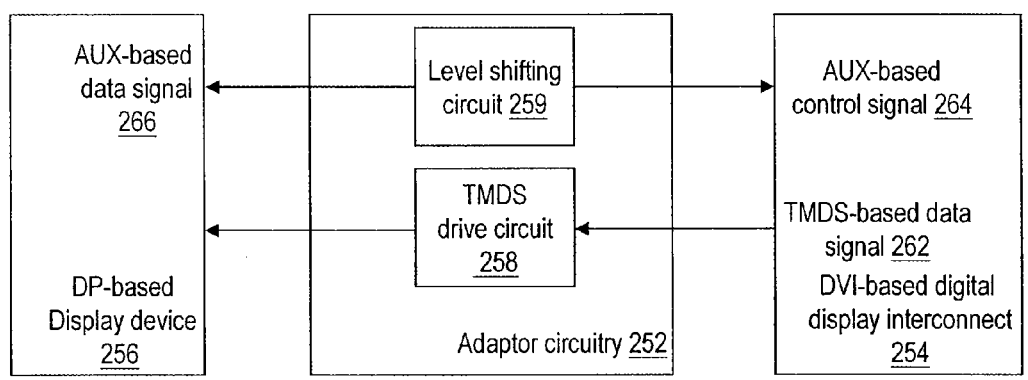
FIG. 2B is a simplified block diagram illustrating another removable adaptor circuitry according to one embodiment of the present invention.

In conjunction with FIG. 1, FIG. 2B is a simplified block diagram showing another removable adaptor circuitry 252 according to one embodiment of the present invention. The adaptor circuitry 252 (the adaptor circuitry 122) is disposed between another DVI-based digital display interconnect 254 (the second digital display interconnect 114) and another DP-based display device 256 (the second display device 118). The adaptor circuitry 252 further comprises a TMDS drive circuit 258 so as to receive another TMDS-based data signal 262 (the data signal 128) from the DVI-based digital display interconnect 254. The adaptor circuitry 252 also includes a level shifting circuit 259 for receiving AUX-based control signals 264 and 266 (the second control signal 126) from both the DVI-based digital display interconnect 254 and the DP-based display device 256, respectively. The transfer of the TMDS-based data signal 262 follows the receipt of the AUX-based control signal 266, which is triggered by the receipt of the AUX-based control signal 264 on the part of the GPU 108.

Figure 3:
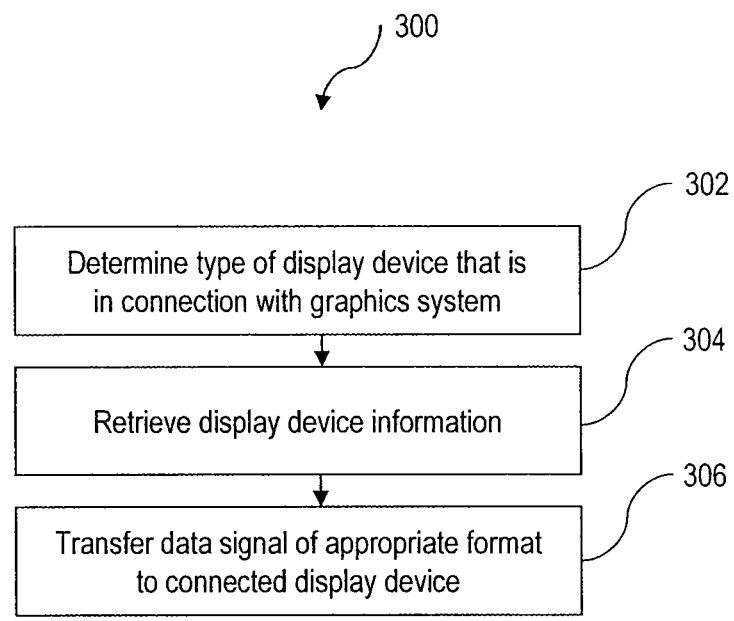
FIG. 3 is a flow chart illustrating a method for supporting multiple digital display interface standards according to one embodiment of the present invention.

In conjunction with FIG. 1, FIG. 3 is a flow chart showing a method 300 for supporting different digital display interface standards according to one embodiment of the present invention. In step 302, the GPU 108 determines the type of the display device 116 or 118 that is in connection with the display interconnect 112 or 114. It is worth noting that the display device type of the display device 116 or 118 may be referred to as the digital display interface standard of the display device 116 or 118. In step 304, the GPU 108 retrieves the display device information associated with the display device 116 or 118 that is in connection with the digital display interconnect 112 or 114, by sending out control signals of formats corresponding to the display device type. In step 306, the GPU 108 outputs the data signal corresponding to display device type of the display device 116 or 118 through the digital display interconnect 112 or 114.

In addition to the above description where only one display device is made in connection with the digital display interconnect or only one control signal is outputted to the display device or received by the GPU, the embodiments of the present invention include the connections of more than one display device and usage of more than one control signal at the same time.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive, CD-RW disks, DVD-RW disks, flash memory, hard-disk drive, or any type of solid-state random-access semiconductor memory) on which alterable information is stored. The above examples, embodiments, instruction semantics, and drawings should not be deemed to be the only embodiments, and are presented to illustrate the flexibility and advantages of the present invention as defined by the following claims.

We claim:

1. An apparatus configured to interface a display device supporting a first digital display interface standard, comprising:
   a removable adaptor circuitry coupled to the display device; and
   a graphics processing unit (GPU) coupled to the removable adaptor circuitry via a digital display interconnect supporting a second digital display interface standard, wherein the GPU is configured to:
      determine a display device type of the display device that is in connection with the digital display interconnect;
      receive a display device information associated with the display device; and
      output a first data signal to the display device; wherein the first digital display interface standard is display port (DP) digital display interface standard and the second digital display interface standard is digital visual interface (DVI) digital display interface standard.

2. The apparatus of claim 1, wherein the GPU is further configured to send a first control signal to the display device in order to receive the display device information.

3. The apparatus of claim 2, wherein the first control signal is of a first format that is corresponding to the display type of the display device.

4. The apparatus of claim 3, wherein the GPU is further configured to receive the display device information in a form of the first control signal of the first format from the display device.

5. The apparatus of claim 2, wherein the adaptor circuitry further comprises a level shifting circuit configured to receive the first control signal in order to raise a voltage level of the first control signal.

6. The apparatus of claim 1, wherein the first data signal is of a second format that is corresponding to the display device type of the display device.

7. The apparatus of claim 1, wherein adaptor circuitry further comprises a data signal circuitry configured to receive the first data signal.

8. The apparatus of claim 1, wherein the GPU determines the display device type with a receipt of a corresponding display device type indication.

9. The apparatus of claim 8, wherein the GPU further comprises a general purpose input output (GPIO) pin that is in communication with the digital display interconnect for providing the corresponding display device type indication for the GPU.

10. The apparatus of claim 8 further comprises a basic input output system (BIOS) that is in communication with the GPU, and a switch in communication with the BIOS wherein the switch is for providing the corresponding display device type indication.

11. The apparatus of claim 8, wherein adaptor circuitry further comprises a ground pin that is in communication with the GPU so as to provide the corresponding display device type indication.

12. A non-transitory computer readable medium containing a sequence of instructions for supporting multiple digital display interface standards, which when executed by a graphics processing unit (GPU), causes the GPU to: determine a display device type of a display device that is in connection with a digital display interconnect; receive a display device information associated with the display device; and output a first data signal to the display device; wherein the display device is of display port (DP) digital display interface standard and the digital display interconnect is of digital visual interface (DV1) digital display interface standard.

13. The non-transitory computer readable medium of claim 12, further comprising a sequence of instructions when executed by the GPU causes the GPU to send a first control signal to the display device in order to receive the display device information.

14. The non-transitory computer readable medium of claim 13, wherein the first control signal is of a first format that is corresponding to the display type of the display device.

15. The non-transitory computer readable medium of claim 13 further comprising a sequence of instructions when executed by the GPU causes the GPU to receive the display device information in a form of the first control signal of the first format from the display device.

16. The non-transitory computer readable medium of claim 12, wherein the first data signal is of a second format that is corresponding to the display device type of the display device.

17. The non-transitory computer readable medium of claim 12 further comprises a sequence of instructions when executed by the GPU causes the GPU to determine the display device type after receiving a corresponding display device type indication.

18. The non-transitory computer readable medium of claim 17, wherein the GPU further comprises a general purpose input output (GPIO) pin that is in communication with the digital display interconnect for providing the corresponding display device type indication.

19. The non-transitory computer readable medium of claim 17, wherein the GPU is further in communication with a basic input output system (BIOS), which is in communication with a switch that provides for the corresponding display device type indication.

20. A computing device capable of supporting multiple digital display interface standards, comprising:
- a display device supporting a first digital display interface standard;
- a graphics system having a digital display interconnect supporting a second digital display interface standard, and a graphics processing unit (GPU) wherein the GPU is configured to determine a display device type of the display device that is in connection with the digital display interconnect, receive a display device information associated with the display device, and output a first data signal to the display device; and
- a removable adaptor circuitry coupled to the display device and the digital display interconnect;
- wherein the first digital display interface standard is of display port (DP) digital display interface standard and the second digital display interface standard is digital visual interface (DVI) digital display interface standard.

* * * * *